United States Patent
Chen et al.

(10) Patent No.: US 10,936,371 B2
(45) Date of Patent: Mar. 2, 2021

(54) METHOD FOR RESOURCE ALLOCATION AND RELATED PRODUCTS

(71) Applicant: Guangdong Oppo Mobile Telecommunications Corp., Ltd., Guangdong (CN)

(72) Inventors: Yan Chen, Guangdong (CN); Jie Cheng, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 89 days.

(21) Appl. No.: 16/180,341

(22) Filed: Nov. 5, 2018

(65) Prior Publication Data
US 2019/0138355 A1 May 9, 2019

(30) Foreign Application Priority Data
Nov. 9, 2017 (CN) .......................... 201711097784.4

(51) Int. Cl.
G06F 9/46 (2006.01)
G06F 9/50 (2006.01)
G06F 16/245 (2019.01)

(52) U.S. Cl.
CPC .......... *G06F 9/505* (2013.01); *G06F 9/5011* (2013.01); *G06F 9/5027* (2013.01); *G06F 16/245* (2019.01)

(58) Field of Classification Search
CPC ...... G06F 9/505; G06F 9/5011; G06F 9/5027; G06F 16/245
See application file for complete search history.

(56) References Cited

U.S. PATENT DOCUMENTS

| | | | | |
|---|---|---|---|---|
| 9,564,866 B2 * | 2/2017 | Zhang | ...................... | H03G 3/20 |
| 10,031,729 B1 * | 7/2018 | Totale | ...................... | G06F 8/38 |
| 2004/0157654 A1 * | 8/2004 | Kataoka | .................. | A63F 13/12 463/4 |
| 2013/0080142 A1 | 3/2013 | Gangemi et al. | | |

(Continued)

FOREIGN PATENT DOCUMENTS

| CN | 101499010 A | 8/2009 |
|---|---|---|
| CN | 104268019 A | 1/2015 |
| CN | 104731304 A | 6/2015 |

(Continued)

OTHER PUBLICATIONS

International search report issued in corresponding international application No. PCT/CN2018/113774 dated Feb. 12, 2019.

(Continued)

*Primary Examiner* — Diem K Cao

(57) ABSTRACT

A method for resource allocation and related products are provided. The method includes the following. A selection operation performed on a target widget of an operation interface of a target application of a terminal device is received by an operating system of the terminal device. A resource adjustment strategy corresponding to the selection operation performed on the target widget is obtained by the operating system, and allocation of at least one system resource for the target application is adjusted by the operating system within a time interval associated with the selection operation performed on the target widget according to the resource adjustment strategy.

8 Claims, 7 Drawing Sheets

(56) References Cited

U.S. PATENT DOCUMENTS

2014/0331235 A1 11/2014 Lee

FOREIGN PATENT DOCUMENTS

| CN | 105677477 | A  | 6/2016  |
|----|-----------|----|---------|
| CN | 105824694 | A  | 8/2016  |
| CN | 106095592 | A  | 11/2016 |
| EP | 2874063   | A2 | 5/2015  |
| WO | 2010084479| A2 | 7/2010  |

OTHER PUBLICATIONS

Extended European search report issued in corresponding European application No. 18204536.9 dated Mar. 11, 2019.
Paul Pearce et al: "AdDroid: privilege separation for applications and advertisers in Android", Proceedings of the 7th ACM Symposium on Information, Computer and Communications Security, ASIACCS '12, Mar. 14, 2013 (Mar. 14, 2013), p. 71, XPO55555920, New York, New York, USA, DOI: 10.1145/2414456.2414498, ISBN: 978-1-4503-1648-4, figure 2.
Examination report issued in corresponding IN application No. 201814041797 dated Jul. 25, 2020.
Communication pursuant to Article 94(3) EPC issued in corresponding European application No. 18204536.9 dated Jul. 14, 2020.

\* cited by examiner

Android system

METHOD FOR RESOURCE ALLOCATION AND RELATED PRODUCTS

CROSS-REFERENCE TO RELATED APPLICATION(S)

This application claims priority to Chinese Patent Application No. 201711097784.4, filed on Nov. 9, 2017, the content of which is hereby incorporated by reference in its entirety.

TECHNICAL FIELD

This disclosure relates to the technical field of terminal devices, and particularly to a method for resource allocation and related products.

BACKGROUND

With the rapid development of technologies relating to terminal devices, an increasing number of applications are installed in mobile phones of users, such as reading applications, payment applications, game applications, music applications, and the like. People's daily life is closely linked with the mobile phones.

At present, people have high requirements on speed and performance in a process of running a target application of a mobile phone. When multiple applications of the mobile phone are running in the background, system resources for the target application running in the foreground, such as network resources, memory resources, central processing unit (CPU) resources, graphic processing unit (GPU) resources and the like, may be occupied by the applications in the background, such that lagging, forced termination, and the like may occur in the process of running the target application, thereby improving user experience.

SUMMARY

Implementations of the present disclosure provide a method for resource allocation and related products.

According to a first aspect of the present disclosure, a method for resource allocation is provided. The method includes the following. A selection operation performed on a target widget of an operation interface of a target application of a terminal device is received by an operating system of the terminal device. A resource adjustment strategy corresponding to the selection operation performed on the target widget is obtained by the operating system, and allocation of at least one system resource for the target application is adjusted by the operating system within a time interval associated with the selection operation performed on the target widget according to the resource adjustment strategy.

According to a second aspect of the present disclosure, a terminal device is provided. The terminal device includes at least one processor and a computer readable memory coupled with the at least one processor. The computer readable memory is configured to store at least one computer executable instruction therein which, when executed by the at least one processor, cause the at least one processor to carry out following actions. A selection operation performed on a target widget of an operation interface of a target application of the terminal device is received by an operating system of the terminal device, a resource adjustment strategy corresponding to the selection operation performed on the target widget is obtained by the operating system, and allocation of at least one system resource for the target application is adjusted by the operating system within a time interval associated with the selection operation performed on the target widget according to the resource adjustment strategy.

According to a third aspect of the present disclosure, a terminal device is provided. The terminal device includes at least one processor and a computer readable memory coupled with the at least one processor. The computer readable memory is configured to store at least one computer executable instruction therein which, when executed by the at least one processor, cause the at least one processor to carry out following actions. A resource adjustment strategy for adjusting at least one system resource for a target application of the terminal device is determined by an operating system of the terminal device in response to a selection operation performed on a target widget of an operation interface of the target application, and the at least one system resource for the target application is adjusted by the operating system according to the resource adjustment strategy.

BRIEF DESCRIPTION OF THE DRAWINGS

The following briefly introduces the accompanying drawings required for describing the implementations.

DETAILED DESCRIPTION

Figure 1A:
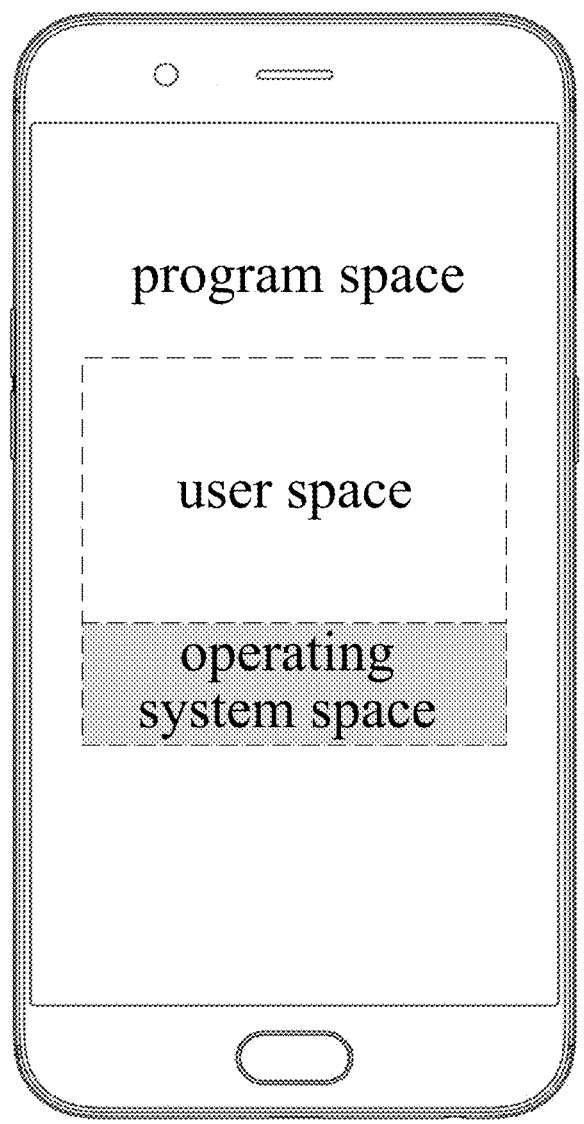
FIG. 1A is a schematic diagram illustrating a running space for running programs of a smart phone.

In order to enable those skilled in the art to better understand solutions of the present disclosure, technical solutions in implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompany drawings of the present disclosure are used to distinguish different objects rather than describe a particular order. In addition, the terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "embodiment" or "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

The terminal device involved in the implementations of the present disclosure may include various handheld devices, in-vehicle devices, wearable devices, computing devices that have wireless communication functions or other processing devices coupled with the wireless modem, as well as various forms of user equipment (UE), mobile stations (MS), terminal devices, and the like. For the convenience of description, the above-mentioned devices are collectively referred as a terminal device. An operating system related to the implementations of the disclosure is a software system that manages hardware resources uniformly and provides a user with a service interface.

According to a first aspect of the present disclosure, a method for resource allocation is provided. The method includes the following: obtaining, by an operating system of a terminal device, a selection operation performed on a target widget of an operation interface of a target application of the terminal device; obtaining, by the operating system, a resource adjustment strategy corresponding to the selection operation performed on the target widget; and adjusting, by the operating system, allocation of at least one system resource for the target application within a time interval associated with the selection operation performed on the target widget according to the resource adjustment strategy.

In an implementation, the obtaining, by the operating system, a resource adjustment strategy corresponding to the selection operation performed on the target widget includes the following: determining, by the operating system, an application behavior associated with the selection operation performed on the target widget, where the application behavior is configured for indicating at least one operation to be executed by the target application after the target widget of the target application being selected; determining, by the operating system, resource load information corresponding to the application behavior, where the resource load information is configured for describing influence on the at least one system resource, and the influence is generated by the application behavior; and determining, by the operating system, the resource adjustment strategy according to the resource load information.

In an implementation, the determining, by the operating system, an application behavior associated with the selection operation performed on the target widget includes the following: determining, by the operating system, the application behavior associated with the selection operation performed on the target widget via querying an application behavior library stored in the terminal device, where the application behavior library contains an association relationship between a plurality of selection operations and a plurality of application behaviors.

In an implementation, the method further includes the following before the determining, by the operating system, the application behavior associated with the selection operation performed on the target widget via querying an application behavior library stored in the terminal device: obtaining, by the operating system, operation records of widgets of the operation interface of the target application, where each of the operation records contains information of a selection of at least two widgets of the operation interface sequentially; obtaining, by the operating system, a plurality of operation record groups via analyzing the operation records, where each of the plurality of operation record groups contains at least two operation records with the same first selected widgets; and generating, by the operating system, an application behavior library according to the plurality of operation record groups.

In an implementation, the method further includes the following before the determining, by the operating system, the application behavior associated with the selection operation performed on the target widget via querying an application behavior library stored in the terminal device: displaying, by the operating system, an application behavior setting interface associated with the target application; obtaining, by the operating system, at least one application behavior via the application behavior setting interface; and generating, by the operating system, an application behavior library according to the at least one application behavior.

In an implementation, the receiving, by the operating system, a selection operation performed on a target widget of an operation interface of a target application includes the following: receiving, by the operating system, the selection operation performed on the target widget of the operation interface of the target application via a preset private connection, where the preset private connection is a communication connection between processes based on a verification and authority mechanism, and the communication connection between processes comprises at least one of the following: socket, pipe, first-in first-out (FIFO), memory share, and file share.

According to a second aspect of the present disclosure, a terminal device is provided. The terminal device includes at least one processor and a computer readable memory coupled with the at least one processor. The computer readable memory is configured to store at least one computer executable instruction therein which, when executed by the at least one processor, cause the at least one processor to carry out following actions. A selection operation performed on a target widget of an operation interface of a target application of the terminal device is received by an operating system of the terminal device, a resource adjustment strategy corresponding to the selection operation performed on the target widget is obtained by the operating system, and allocation of at least one system resource for the target application is adjusted by the operating system within a time interval associated with the selection operation performed on the target widget according to the resource adjustment strategy.

According to a third aspect of the present disclosure, a terminal device is provided. The terminal device includes at least one processor and a computer readable memory coupled with the at least one processor. The computer readable memory is configured to store at least one computer executable instruction therein which, when executed by the at least one processor, cause the at least one processor to carry out following actions. A resource adjustment strategy for adjusting at least one system resource for a target application of the terminal device is determined by an operating system of the terminal device in response to a selection operation performed on a target widget of an operation interface of the target application, and the at least one system resource for the target application is adjusted by the operating system according to the resource adjustment strategy.

Figure 1B:
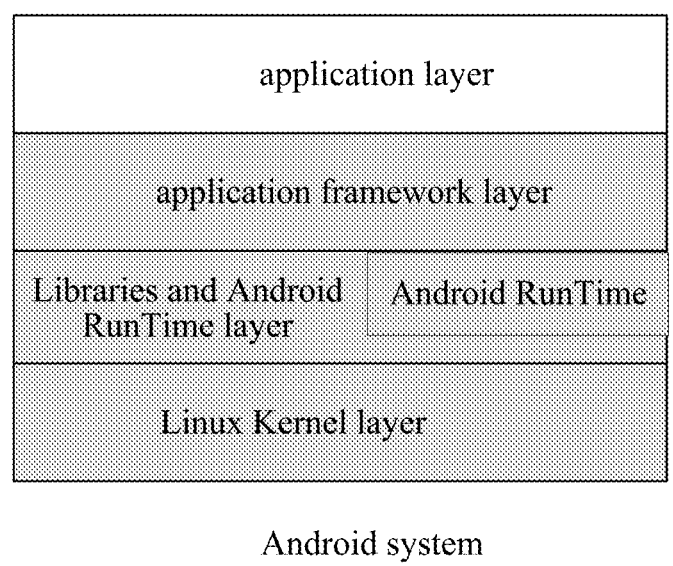
FIG. 1B is a schematic diagram illustrating a system architecture of an Android system.

As illustrated in FIG. 1A, a terminal device such as a smart phone and the like generally has a program space for running programs. The program space for running programs includes a user space and an operating system space. One or more applications, which are third-party applications installed in the terminal device, run in the user space. An operating system of the terminal device runs in the operating system space. Examples of the operating system that can be run in the mobile terminal include but are not limited to an Android system, a mobile operating system iOS developed by Apple®, etc, and the present disclosure is not limited thereto. As illustrated in FIG. 1B, the following takes that the Android system runs in the terminal device as an example, the user space of the Android system includes an application layer of the Android system and the operating system space of the Android system can include an application framework layer, a libraries and Android Runtime layer (including libraries and Android RunTime), and a Linux kernel layer of the Android system. The application layer includes various applications directly interacting with a user, or service programs written in the Java language and running in the background, for example, programs for implementing common basic functions of smart phones, such as short messaging service (SMS), telephone dialing, picture viewers, calendars, games, maps, world wide web (Web) browsers, etc., as well as other applications developed by developers. The application framework layer provides a series of libraries required in developing Android applications, which can be used to reuse components as well as personalize extensions through inheritance. The libraries and Android RunTime layer can support the application framework and provides services for various components in the Android system. The libraries and Android RunTime layer is consisted of libraries and Android RunTime. The Android RunTime contains a core library and a dalvik virtual machine. The Linux kernel layer is operable to implement core functions such as hardware device driving, process and memory management, network protocol stacks, power management, wireless communication, and the like.

The Android applications may be consisted of four types of components, which are activities, services, content providers, and broadcaster receivers. Message transmission among the components is realized via object transmission. The activity is the most basic and the most common component of the core components of the Android applications, and is a window for interaction between the user and the applications. Generally, an Android application may be consisted of one or more activities, and one activity corresponds to a single view for information display, by clicking components for different views, jump of different views can be triggered. However, a jump relationship of the activities in the applications is fixed, i.e., application behaviors triggered by click operations on different positions of different interfaces are generally fixed.

In view of the above condition, implementations of the present disclosure provide a method for resource allocation for a target application of a terminal device. In the method, the target application is a third-party application, and an operating system obtains a selection operation performed on a target widget of an operation interface of the target application. The operating system obtains a resource adjustment strategy corresponding to the selection operation performed on the target widget. The operating system adjusts, according to the resource adjustment strategy, allocation of system resources for the target application within a time interval associated with the selection operation performed on the target widget. Since when the operating system determines the selection operation performed on the target widget of the operation interface of the target application, the operating system obtains the resource adjustment strategy corresponding to the selection operation performed on the target widget, and adjusts the system resources allocated to the target application according to the resource adjustment strategy, thus advance awareness of resource load generated by the selection operation performed on the target widget can be realized and optimization of resource allocation can be performed in time, accurate optimization for different selection operations performed on different interfaces of the target application can be performed in real time, thereby improving fluency and stability in the process of running the target application of the terminal device.

The following describes the implementations of the disclosure in conjunction with the accompanying drawings.

Figure 2:
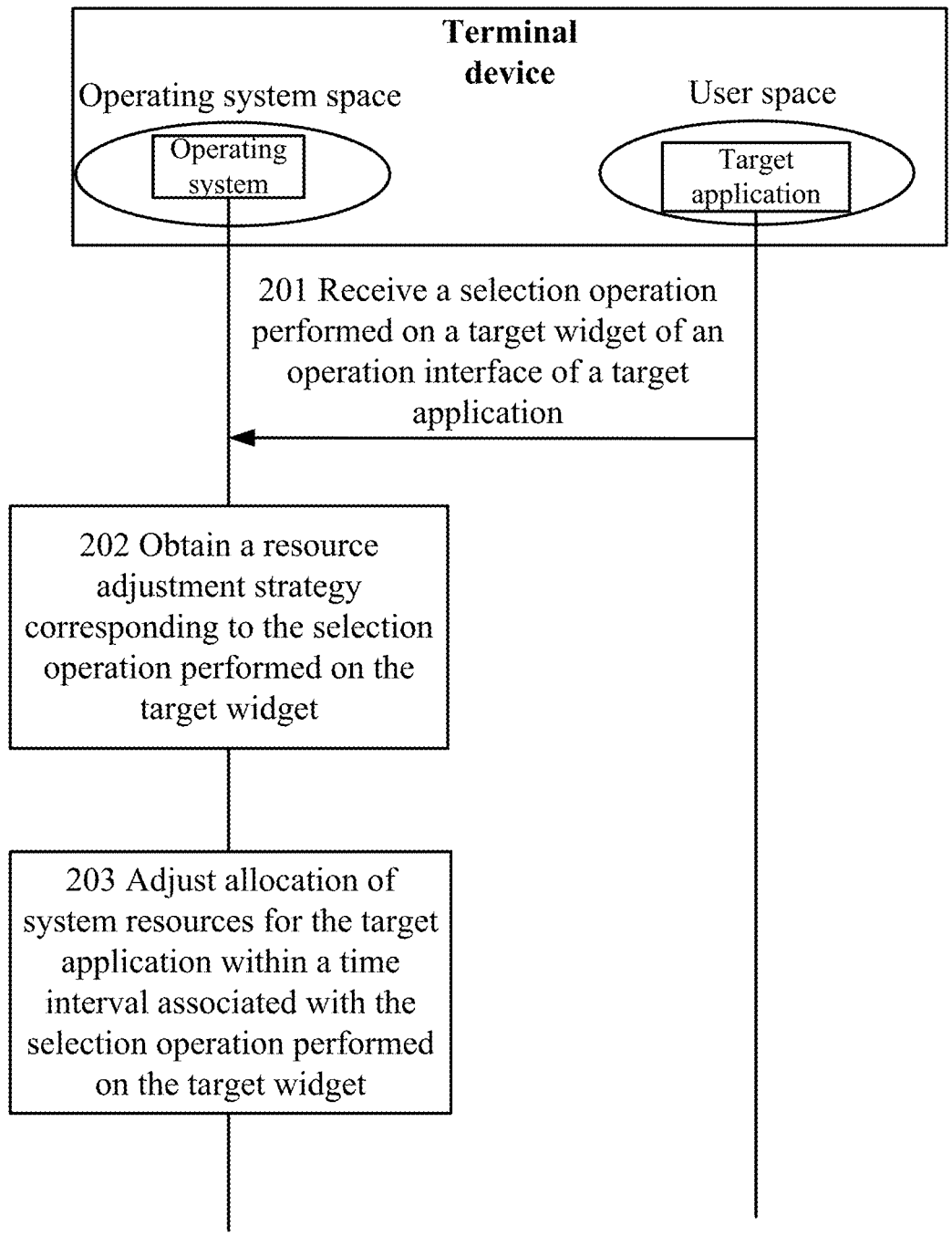
FIG. 2 is a schematic flow chart illustrating a method for resource allocation according to an implementation of the present disclosure.

Referring to FIG. 2, FIG. 2 is a schematic flow chart illustrating a method for resource allocation according to an implementation of the present disclosure. The method is applied to a terminal device. An operating system and one or more applications are run in the terminal device. As illustrated in the figure, the method begins at block 201.

At block 201, the operating system receives a selection operation performed on a target widget of an operation interface of a target application of the terminal device.

The target application is a third-party application installed in a user space of the terminal device, can be, for example, an application for playing games, an application for shopping, an application for payment, and the like, and can be installed in response to user operation, and can also be pre-installed by a developer prior to delivering the terminal device, and the present disclosure is not limited thereto.

In a possible implementation, before the operating system receives the selection operation performed on the target widget of the operation interface of the target application, the method further includes the following. The operating system receives, via a preset private connection, an application behavior associated with the target widget from an application behavior library of the target application. The preset private connection is a communication connection between processes based on a verification and authority mechanism, that is, the verification and authority mechanism is employed for the communication connection between processes. The communication connection between processes may include at least one of the following: socket, pipe, first-in first-out (FIFO), memory share, and file share.

The operating system receives, via a preset private connection, the selection operation performed on the target widget of the operation interface of the target application, thus efficiency of message reception and safety of message transmission can be improved.

The preset private connection is the communication connection between processes based on the verification and authority mechanism, thus after the operating system verifying and authorizing the target application, the preset private connection between the operating system and the target application can be established.

In a possible implementation, before the operating system receives, via the preset private connection, the selection operation performed on the target widget of the operation interface of the target application, the method further includes the following. The operating system receives a request for establishing a private connection from the target application, where the request for establishing a private connection includes an application identifier of the target application. When the operating system determines that the application identifier is contained in a preset application identifier set, the preset private connection is established.

Before the operating system receives via the preset private connection the selection operation performed on the target widget of the operation interface of the target application, the operating system first receives the request for establishing a private connection via a common system interface or a standard interface. The request contains the application identifier of the target application. The application is verified via the application identifier. When the operating system determines that the application identifier is contained in the preset application identifier set, the operating system allocates a data transmission interface to the target application, such that the preset private connection between the operating system and the target application can be established.

The preset private connection is a valid preset private connection established between the target application and the operating system in the process of running the target application. When the target application is not running, the preset private connection can be automatically cut off.

In the possible implementation, the target application may contain a data collection module, a data process module, a priority management module, and a data reception module. The data collection module is configured to collect key information in the process of running the target application. The data process module is configured to process the collected key information, for example, integrate repetitive information, delete redundant information, and so on. The priority management module is configured to classify the collected key information according to importance of the key information. The key information having a high priority is first processed, and the key information having a low priority is filtered, or the key information having the low priority is less used in the process of creating data packets. The data reception module is configured to receive and parse data transmitted by the operating system, and transmit the parsed data to the interior of the target application.

At block 202, the operating system obtains a resource adjustment strategy corresponding to the selection operation performed on the target application.

At block 203, the operating system adjusts, according to the resource adjustment strategy, allocation of one or more system resources for the target application within a time interval associated with the selection operation performed on the target widget.

The system resources include at least one of the following: central processing unit (CPU) resources, graphic processing unit (GPU) resources, memory bandwidth resources, disk resources, and network resources, where the network resources include network resources of a data network of the terminal device, network resources of a wireless fidelity (Wi-Fi) network of the terminal device, control parameter resources of a Bluetooth module of the terminal device, and the like.

When the system resources are at least one of the CPU resources, the GPU resources, the memory bandwidth resources, and the disk resources, the operating system can adjust the allocation of the system resources via direct communication with a kernel layer of an operating system space. The direct communication means communicating directly through an abstract application programming interface (API).

When the system resources are the network resources, the operating system can adjust the allocation of the system resources via indirect communication with the kernel layer of the operating system space. The indirect communication is conducted by invoking proxy services. For example, a Wi-Fi subsystem or a data network subsystem of the network resources is not running in the same system as the operating system, in this situation, the system resources are accessed indirectly through some proxy manners. The operating system provides a Wi-Fi proxy service to indirectly communicate with the Wi-Fi subsystem by invoking an interface of the proxy service.

After adjusting the system resources allocated to the target application according to the resource adjustment strategy, or after the time interval associated with an associated application behavior elapsing, the target application can transmit a request for canceling the resource adjustment to the operating system. After the operating system receiving the request for canceling the resource adjustment, the operating system cancels or stops the adjustment of to-be-adjusted system resources according to an adjustment amount of each of the to-be-adjusted system resources.

It can be seen that in the implementation of the present disclosure, firstly, the operating system in the operating system space of the terminal device receives the selection operation performed on the target widget of the operation interface of the target application, secondly, the operating system obtains the resource adjustment strategy corresponding to the selection operation performed on the target widget, and finally, the operating system adjusts, according to the resource adjustment strategy, the allocation of the system resources for the target application within the time interval associated with the selection operation performed on the target widget. Since when the operating system determines the selection operation performed on the target widget of the operation interface of the target application, the operating system obtains the resource adjustment strategy corresponding to the selection operation performed on the target widget, and adjusts the allocation of the system resources for the target application according to the resource adjustment strategy, thus advance awareness of resource load generated by the selection operation performed on the target widget can be realized and optimization of resource allocation can be performed in time, accurate optimization for different selection operations performed on different interfaces of the target application can be performed in real time, thereby improving fluency and stability in the process of running the target application of the terminal device.

In a possible implementation, obtaining the resource adjustment strategy corresponding to the selection operation performed on the target widget by the operating system includes the following. The operating system determines an application behavior associated with the selection operation performed on the target widget, where the application behavior is configured for indicating at least one operation to be executed by the target application after the target widget of the target application being selected. The operating system determines resource load information corresponding to the application behavior, where the resource load information is configured for describing influence on the system resources, and the influence is generated by the application behavior. The operating system determines the resource adjustment strategy according to the resource load information.

When the target application is running in the foreground, different application interfaces of the target application contain different widgets. Different application behaviors can be triggered by selecting different widgets. When the selection operation performed on the target widget is detected, the application behavior associated with the selection operation performed on the target widget can be obtained, thus the possible application behavior brought by the selection operation performed on the target widget can be determined in advance, thereby further determining the resource adjustment strategy.

The application behavior is configured for indicating the at least one operation to be executed by the target application performed after the target widget of the target application being selected, i.e., the application behavior contains a jump relationship between activities after the target widget being selected.

The operating system can determine the resource load information according to the application behavior, so as to generate or determine the resource adjustment strategy. For example, when the system resources needed to be adjusted at current time is the network resource, the network resource of 200 bits per second is needed to finish each operation contained in the associated application behavior within the time interval associated with the selection operation performed on the target widget. However, the network resource currently allocated is the network resource of 160 bits per second, thus the network resource needs to be increased by 40 bits per second.

It can be seen that in the implementation, according to the application behavior associated with the selection operation performed on the target widget, the corresponding resource load information is determined beforehand, the resource adjustment strategy is then determined, and the system resources allocated to the target application can be adjusted according to the resource adjustment strategy, which is advantageous to improve fluency and running efficiency in the process of running the target application.

In a possible implementation, the terminal device stores an application behavior library. The application behavior library contains an association relationship between multiple selection operations and multiple application behaviors. Determining the application behavior associated with the selection operation performed on the target widget by the operating system may include the following. The operating system queries the application behavior library to determine the application behavior associated with the selection operation performed on the target widget.

For a selection operation performed on any widget, there is a corresponding application behavior. The application behavior contains multiple continuous operations or at least one operation. The terminal device stores application behaviors of multiple widgets of the target application in advance and constitutes the application behavior library. The application behavior library contains the application behavior associated with the target widget.

It can be seen that in the implementation, by means of a simple query algorithm, the application behavior associated with the selection operation performed on the target widget can be determined. Determining the application behavior associated with the selection operation performed on the target widget by querying the application behavior library is advantageous to further determine the resource adjustment strategy according to the associated application behavior.

In a possible implementation, the method may further include the following. The operating system obtains operation records of widgets of the operation interface of the target application, analyzes the operation records to obtain at least one operation record set. Each of the operation records contains information of a selection of at least two widgets of the operation sequentially. Each operation record set contains multiple operation record groups, and each operation record group contains multiple operation records with the same first selected widgets, where the multiple operation records are continuous operation records, and the first selected widgets of the operation records in each operation record group are the same. For example, it is assumed that an operation record group contains two operation records, referred as a first operation record and a second operation record, the first operation record is that a widget A (e.g., a login button, the login button is selected after inputting user information, for example, a user name and a password) and a widget B (e.g., a verify button, the verify button is selected after inputting information for verification for example some characters) are selected sequentially, and the second operation record is that the widget A, the widget B, and a widget C (e.g., a confirm button, the confirm button is selected after confirming a choice for example a selection of a reading mode) are selected sequentially, the first operation record and the second operation record have the same first selected widget, i.e., the widget A. The operating system generates the application behavior library according to the at least one operation record set.

The terminal device obtains history operation records of all widgets of the current operation interface of the target application, and the operation records are continuous operation records. For example, an operation record 1 is that a widget 1, a widget 2, and a widget 3 are selected in sequence, and an operation record 2 is that a widget 4, a widget 5, and a widget 6 are selected in sequence. The terminal device further obtains at least one operation record set. The operation record set contains multiple operation records of multiple widgets of the operation interface that are possibly triggered. The operation record set contains multiple operation record groups, where each operation record group contains at least two operation records, in the at least two operation records the first selected widgets are the same, i.e., one widget corresponds to one operation record group. The operating system generates the application behavior library according to the operation record set.

It can be seen that in the implementation, the operating system determines at least one operation record set according to the operation records of the widgets of the operation interface, where the operation record set contains multiple operation record groups, and each operation record group contains multiple operation records. The operating system generates the application behavior library according to the operation record set, and it is advantageous to determine the application behavior associated with the target widget according to the application behavior library.

In a possible implementation, the method may further include the following. The operating system displays an application behavior setting interface associated with the target application, for example, displays the application behavior setting interface on a touch display screen of the terminal device. The operating system further obtains at least one application behavior via the application behavior setting interface, and generates the application behavior library according to the at least one application behavior.

The application behavior setting interface associated with the target application can be displayed on the touch display screen of the terminal device. Multiple application behaviors of interface widgets can be changed via the application behavior setting interface, and multiple default application behaviors of the interface widgets can also be obtained, and the application behavior library is generated according to the multiple application behaviors.

It can be seen that in the implementation, at least one application behavior of the widgets of the operation interface can be obtained via the application behavior setting interface, the application behavior library is generated according to the at least one application behavior, and it is advantageous to determine the application behavior associated with the target widget according to the application behavior library.

In a possible implementation, adjusting, by the operating system, the allocation of the system resources for the target application according to the resource adjustment strategy may include the following. The operating system determines types of to-be-adjusted system resources, determines an adjustment amount of each of the to-be-adjusted system resources, and adjusts the system resources sequentially according to the adjustment amount of each of the to-be-adjusted system resources.

The operating system can determine the types of the to-be-adjusted system resources according to the system resource adjustment strategy. The to-be-adjusted system resources may be at least one of the CPU resources, the GPU resources, the memory bandwidth resources, the disk resources, the network resources, and IO resources. The to-be-adjusted system resources may be one or more system resources, and also may be in the form of a resource combination.

After determining the types of the to-be-adjusted system resources, the adjustment amount of each of the to-be-adjusted system resources can be further determined, and the to-be-adjusted system resources are adjusted sequentially according to the adjustment amount of each of the to-be-adjusted system resources.

It can be seen that in the implementation, the resource adjustment strategy contains the types of the to-be-adjusted system resources and the adjustment amount of each of the to-be-adjusted system resources. Adjusting the to-be-adjusted system resources sequentially according to the adjustment amount of each of the to-be-adjusted system resources is advantageous to improve the fluency and stability in the process of running the target application of the terminal device.

In a possible implementation, the resource adjustment strategy contains the time interval associated with the associated application behavior. Determining the adjustment amount of each of the to-be-adjusted system resources by the operating system may include the following. The operating system determines a usage amount of each of the to-be-adjusted system resources, and determines the adjustment amount of each of the to-be-adjusted system resources according to the usage amount of each of the to-be-adjusted system resources and the time interval associated with the associated application behavior.

The resource adjustment strategy contains the time interval associated with the associated application behavior. For example, the associated application behavior contains four operations, and the time interval associated with the associated application behavior is a time length required for finishing the four operations under a condition that the target application is running fluently, for example, the time interval may be two seconds. When multiple applications run in the background of the terminal device, the load of the terminal device is great, and the time length required for finishing the four operations contained in the associated application behavior is larger than the associated time interval for example two seconds, which indicates that the target application is not running fluently. In the implementation of the present disclosure, the associated application behavior can be enabled to finish multiple operations within the associated time interval.

The operating system can determine the usage amount of each of the to-be-adjusted system resources, and determine within the time interval associated with the associated application behavior the adjustment amount of each of the to-be-adjusted system resources according to the usage amount of each of the to-be-adjusted system resources. For example, when the system resources needed to be adjusted at current time is the network resource, the network resource of 200 bits per second is needed to finish each operation contained in the application behavior within the time interval associated with the associated application behavior. However, the network resource currently allocated is the network resource of 160 bits per second, thus the network resource needs to be increased by 40 bits per second.

It can be seen that in the implementation, the adjustment amount of each of the to-be-adjusted system resources is determined according to the usage amount of each of the to-be-adjusted system resources and the time interval associated with the associated application behavior, and each of the to-be-adjusted system resources is adjusted according to the adjustment amount of each of the to-be-adjusted system resources, which is advantageous for the associated application behavior to finish the multiple operations contained in the associated application behavior within the associated time interval.

In a possible implementation, adjusting, by the operating system, each of the to-be-adjusted system resources according to the adjustment amount of each of the to-be-adjusted system resources may include the following. The operating system determines a priority of each of the to-be-adjusted system resources, and adjusts the to-be-adjusted system resources sequentially in a descending order of priorities.

The to-be-adjusted system resources may be one or more of the CPU resources, the GPU resources, the memory bandwidth resources, the disk resources, the network resources, and the IO resources. The terminal device sets the priority of each of the system resources in advance. The operating system can adjust each of the to-be-adjusted system resources in the descending order of priorities.

The terminal device determines, according to history usage records of each application behavior, the usage amount of each system resource used by each application behavior in the running process, and determines the priority of each system resource according to the usage amount of each system resource, for example, the system resource having a high usage amount ration has a high priority.

It can be seen that in the implementation, the terminal device sets the priority of each of the system resources in advance. Therefore, when the to-be-adjusted system resources are adjusted, the to-be-adjusted system resources are sequentially adjusted in the descending order of priorities, which is advantageous for a user to quickly aware that performance optimization is realized in the process of running the target application, i.e., the target application is accelerated.

Figure 3:
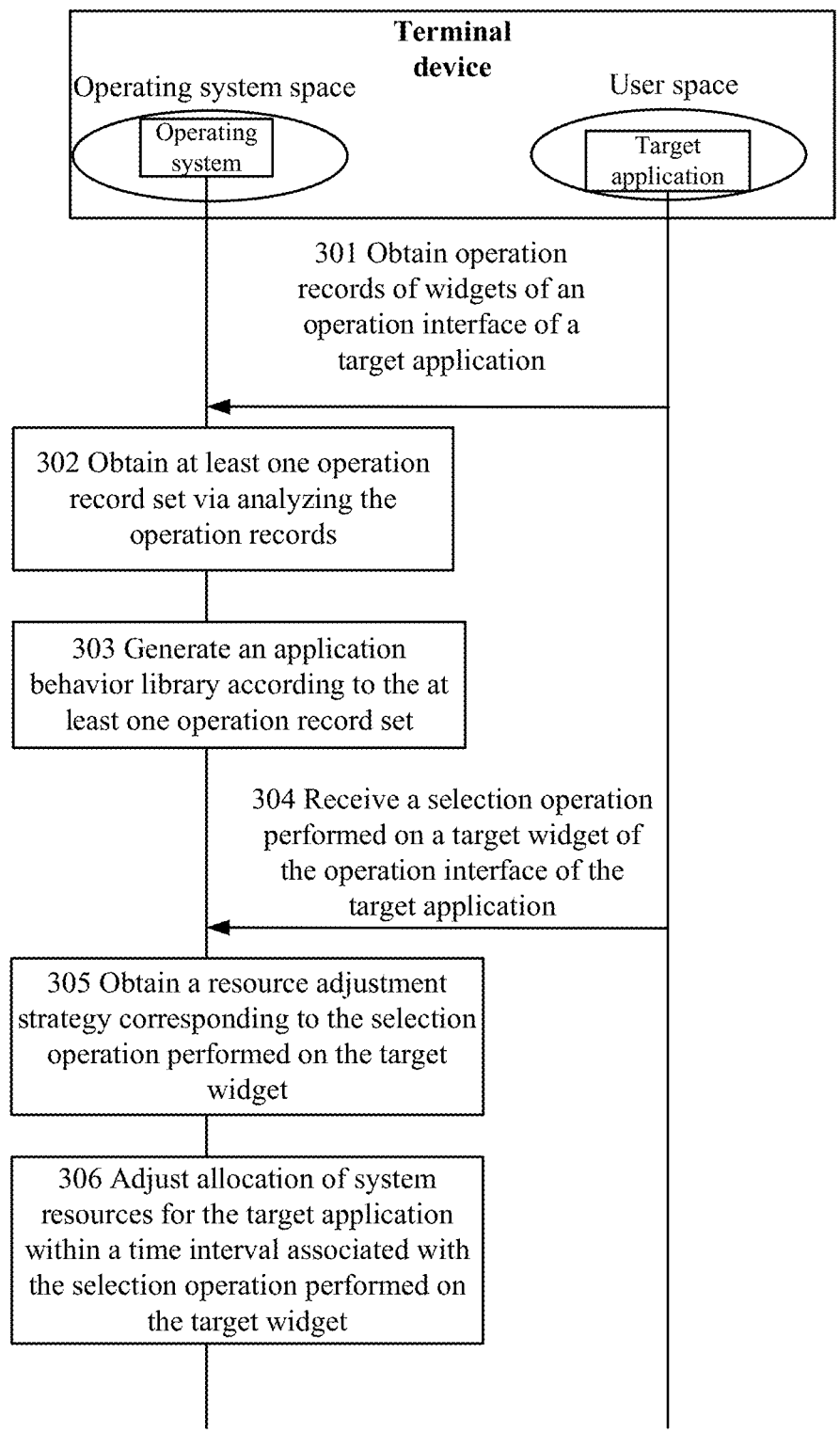
FIG. 3 is a schematic flow chart illustrating a method for resource allocation according to an implementation of the present disclosure.

In consistent with the implementations illustrated in FIG. 2, referring to FIG. 3, FIG. 3 is a schematic flow chart illustrating a method for resource allocation according to an implementation of the present disclosure. The method is applied in a terminal device. An operating system and one or more applications are run in the terminal device. As illustrated in the figure, the method begins at block 301.

At block 301, the operating system obtains operation records of widgets of an operation interface of a target application of a terminal device.

At block 302, the operating system obtains at least one operation record set via analyzing the operation records, where each of the operation records contains information of a selection of at least two widgets of the operation sequentially, each operation record set contains multiple operation record groups, each operation record group contains multiple operation records with the same first selected widgets. The multiple operation records in each operation record group are continuous operation records.

At block 303, the operating system generates an application behavior library according to the at least one operation record set.

At block 304, the operating system receives a selection operation performed on a target widget of the operation interface of the target application.

At block 305, the operating system obtains a resource adjustment strategy corresponding to the selection operation performed on the target application.

At block 306, the operating system adjusts, according to the resource adjustment strategy, allocation of one or more system resources for the target application within a time interval associated with the selection operation performed on the target widget.

It can be seen that in the implementation of the present disclosure, firstly, the operating system in the operating system space of the terminal device receives the selection operation performed on the target widget of the operation interface of the target application, secondly, the operating system obtains the resource adjustment strategy corresponding to the selection operation performed on the target widget, and finally, the operating system adjusts, according to the resource adjustment strategy, the allocation of the system resources for the target application within the time interval associated with the selection operation performed on the target widget. Since when the operating system determines the selection operation performed on the target widget of the operation interface of the target application, the operating system obtains the resource adjustment strategy corresponding to the selection operation performed on the target widget, and adjusts the system resources allocated to the target application according to the resource adjustment strategy, thus advance awareness of resource load caused by the selection operation performed on the target widget can be realized and optimization of resource allocation can be performed in time, accurate optimization for different selection operations performed on different interfaces of the target application can be performed in real time, thereby improving fluency and stability in the process of running the target application of the terminal device.

In addition, the operating system determines the at least one operation record set according to the operation records of the components of the operation interface, where the operation record set contains multiple operation record groups, each operation record group contains multiple operation records, the application behavior library is generated according to the operation record set, and it is advantageous to determine the application behavior associated with the target widget according to the application behavior library.

Figure 4:
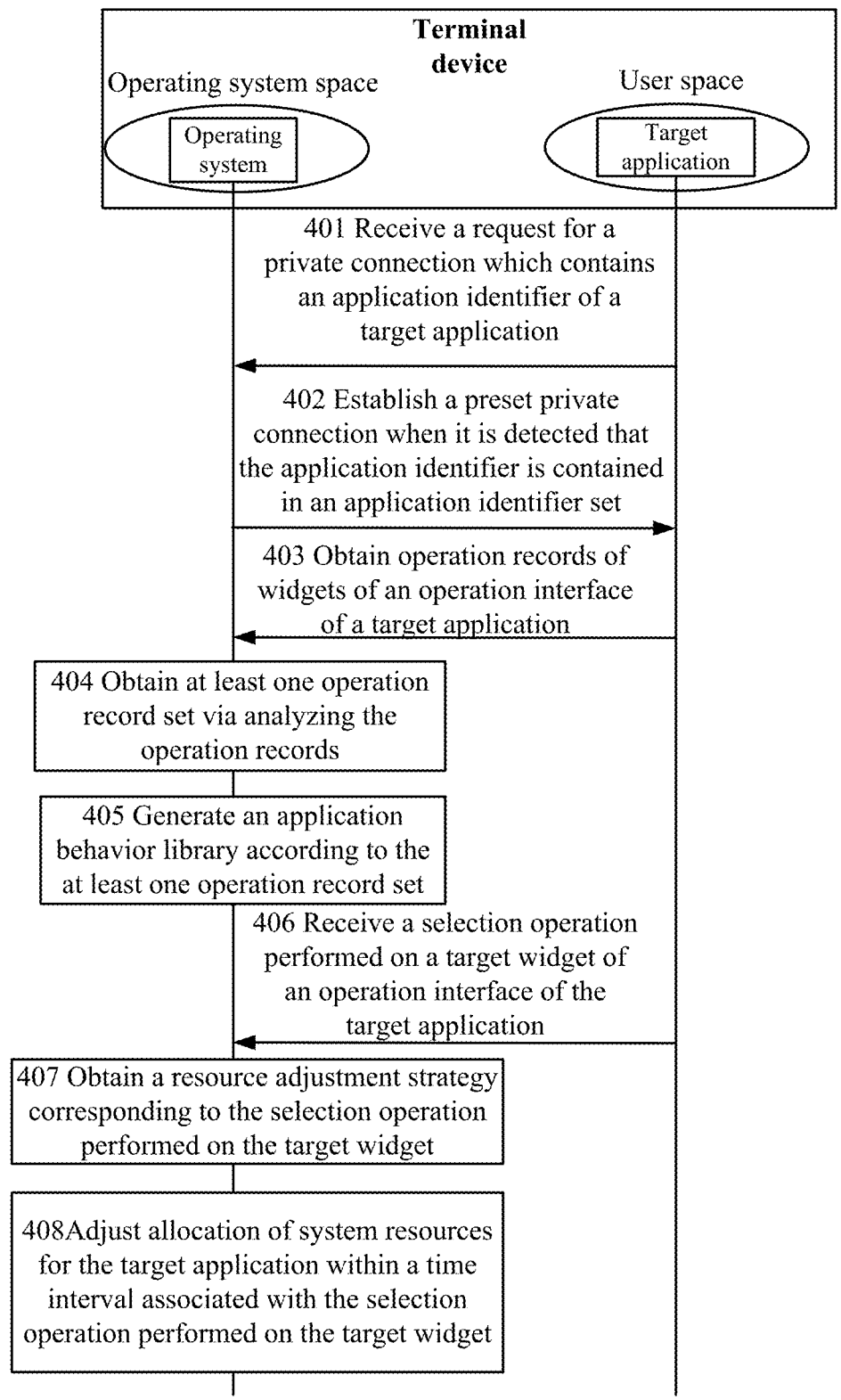
FIG. 4 is a schematic flow chart illustrating a method for resource allocation according to an implementation of the present disclosure.

In consistent with the implementations illustrated in FIG. 2, referring to FIG. 4, FIG. 4 is a schematic flow chart illustrating a method for resource allocation according to an implementation of the present disclosure. The method is applied in a terminal device. An operating system and one or more applications are run in the terminal device. As illustrated in the figure, the method begins at block 401.

At block 401, the operating system receives a request for establishing a private connection from a target application of the terminal device, where the request for establishing a private connection contains an application identifier of the target application.

At block 402, when the operating system determines that the application identifier is contained in a preset application identifier set, the preset private connection is established.

At block 403, the operating system obtains operation records of widgets of an operation interface of the target application.

At block 404, the operating system obtains at least one operation record set via analyzing the operation records, where each of the operation records contains information of a selection of at least two widgets of the operation sequentially, each operation record set contains multiple operation record groups, and each operation record group contains multiple operation records with the same first selected widgets. The multiple operation records in each operation record group are continuous operation records.

At block 405, the operating system generates an application behavior library according to the at least one operation record set.

At block 406, the operating system receives a selection operation performed on a target widget of the operation interface of the target application.

At block 407, the operating system obtains a resource adjustment strategy corresponding to the selection operation performed on the target application.

At block 408, the operating system adjusts, according to the resource adjustment strategy, allocation of one or more system resources for the target application within a time interval associated with the selection operation performed on the target widget.

It can be seen that in the implementation of the present disclosure, firstly, the operating system in the operating system space of the terminal device first receives the selection operation performed on the target widget of the operation interface of the target application, secondly, the operating system obtains the resource adjustment strategy corresponding to the selection operation performed on the target widget, and finally, the operating system adjusts, according to the resource adjustment strategy, the allocation of the system resources for the target application within the time interval associated with the selection operation performed on the target widget. Since when the operating system determines the selection operation performed on the target widget of the operation interface of the target application, the operating system obtains the resource adjustment strategy corresponding to the selection operation performed on the target widget, and adjusts the system resources allocated to the target application according to the resource adjustment strategy, thus advance awareness of resource load caused by the selection operation performed on the target widget can be realized and optimization of resource allocation can be performed in time, accurate optimization for different selection operations performed on different interfaces of the target application can be performed in real time, thereby improving fluency and stability in the process of running the target application of the terminal device.

In addition, the operating system determines the at least one operation record set according to the operation records of the components of the operation interface, where the operation record set contains multiple operation record groups, each operation record group contains multiple operation records, the application behavior library is generated according to the operation record set, and it is advantageous to determine the application behavior associated with the target widget according to the application behavior library.

In addition, the preset private connection is a communication connection between processes based on a verification and authority mechanism. After the operating system verifying and authoring the target application, the preset private connection between the operating system and the target application can be established. The operating system receives configuration messages transmitted by the target application via the preset private connection, thus efficiency of message reception and safety of message transmission can be improved.

Figure 5:
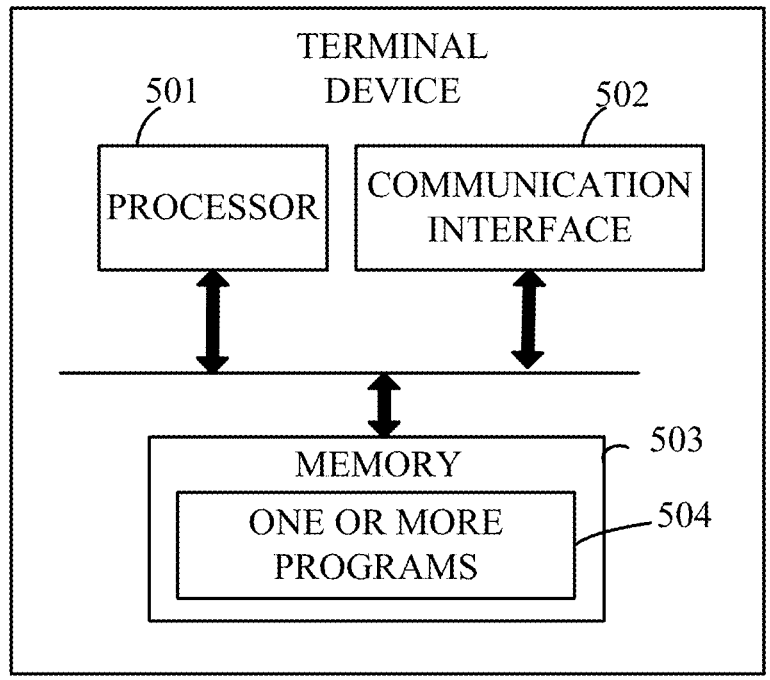
FIG. 5 is a schematic structural diagram illustrating a terminal device according to an implementation of the present disclosure.

In consistent with the implementations illustrated in FIG. 2, FIG. 3, and FIG. 4, referring to FIG. 5, FIG. 5 is a schematic diagram illustrating a terminal device according to an implementation of the present disclosure. On or more applications and an operating system are run in the terminal device. As illustrated in the figure, the terminal device includes a processor 501, a memory 502, a communication interface 503, and one or more programs 504. The one or more programs 504 are different from the one or more applications. The one or more programs 504 are stored in the memory 502, and are configured to be executed by the processor 501. The one or more programs 504 contain instructions for performing the following. The operating system is controlled to receive a selection operation performed on a target widget of an operation interface of a target application of the terminal device, the operating system is controlled to obtain a resource adjustment strategy corresponding to the selection operation performed on the target application, and the operating system is controlled to adjust allocation of one or more system resources for the target application within a time interval associated with the selection operation performed on the target widget according to the resource adjustment strategy.

It can be seen that in the implementation of the present disclosure, firstly, the operating system in the operating system space of the terminal device receives the selection operation performed on the target widget of the operation interface of the target application, secondly, the operating system obtains the resource adjustment strategy corresponding to the selection operation performed on the target widget, and finally, the operating system adjusts, according to the resource adjustment strategy, the allocation of the system resources for the target application within the time interval associated with the selection operation performed on the target widget. Since when the operating system determines the selection operation performed on the target widget of the operation interface of the target application, the operating system obtains the resource adjustment strategy corresponding to the selection operation performed on the target widget, and adjusts the system resources allocated to the target application according to the resource adjustment strategy, thus advance awareness of resource load caused by the selection operation performed on the target widget can be realized and optimization of resource allocation can be performed in time, accurate optimization for different selection operations performed on different interfaces of the target application can be performed in real time, thereby improving fluency and stability in the process of running the target application of the terminal device.

In a possible implementation, as for obtaining, by the operating system, the resource adjustment strategy corresponding to the selection operation performed on the target widget, the instructions in the one or more programs are further configured to perform the following. The operating system is controlled to determine an application behavior associated with the selection operation performed on the target widget, where the application behavior is configured for indicating at least one operation to be executed by the target application performed after the target widget of the target application being selected. The operating system is controlled to determine resource load information corresponding to the application behavior, where the resource load information is configured for indicating influence on the system resources, and the influence is generated by the application behavior, and the operating system is controlled to determine the resource adjustment strategy according to the resource load information.

In a possible implementation, the terminal device stores an application behavior library, and the application behavior library contains an association relationship between multiple selection operations and multiple application behaviors. As for determining, by the operating system, the application behavior associated with the selection operation performed on the target widget, the instructions in the one or more programs are further configured to perform the following. The operating system is controlled to determine the application behavior associated with the selection operation performed on the target widget via querying the application behavior library.

In a possible implementation, the instructions in the one or more programs are further configured to perform the following. The operating system is controlled to obtain operation records of widgets of the operation interface of the target application, and obtain at least one operation record set via analyzing the operation records. Each of the operation records contains information of a selection of at least two widgets of the operation sequentially. Each operation record set contains multiple operation record groups, and each operation record group contains multiple operation records with the same first selected widgets. The multiple operation records in each operation record group are continuous operation records, and the first selected widgets of the operation records in each operation record group are the same. The operating system is further controlled to generate the application behavior library according to the at least one operation record set.

In a possible implementation, the instructions in the one or more programs are further configured to perform the following. The operating system is controlled to display an application behavior setting interface associated with the target application, obtain at least one application behavior via the application behavior setting interface, and generate the application behavior library according to the at least one application behavior.

In a possible implementation, before the operating system receives the selection operation performed on the target widget of the operation interface of the target application, the instructions in the one or more programs are further configured to perform the following. The operating system is controlled to obtain via a preset private connection the application behavior associated with the target widget from an application behavior library of the target application. The preset private connection is a communication connection between processes based on a verification and authority mechanism, that is, the verification and authority mechanism is employed for the communication connection between processes. The communication connection between processes may include at least one of the following: socket, pipe, first-in first-out (FIFO), memory share, and file share.

In a possible implementation, before the operating system receives the selection operation performed on the target widget of the operation interface of the target application, the instructions in the one or more programs are further configured to perform the following. The operating system is controlled to receive a request for establishing a private connection from the target application, where the request for establishing a private connection contains an application identifier of the target application. The operating system is further controlled to establish the preset private connection when the operating system determines that the application identifier is contained in a preset application identifier set.

In a possible implementation, the system resources include at least one of the following: CPU resources, GPU resources, memory bandwidth resources, disk resources, and network resources.

The foregoing solution of the implementations of the disclosure is mainly described from the viewpoint of execution process of the methods. It can be understood that, in order to implement the above functions, the terminal device may include hardware structures and/or software modules corresponding to the various functions. Those skilled in the art should readily recognize that, in combination with the example units and strategy operations described in the implementations disclosed herein, the present disclosure can be implemented in hardware or a combination of the hardware and computer software. Whether a function is implemented by way of the hardware or hardware driven by the computer software depends on the particular application and design constraints of the technical solution. Those skilled in the art may use different methods to implement the described functions for each particular application, but such implementation should not be considered as beyond the scope of the present disclosure.

According to the implementations of the disclosure, functional units may be divided for the terminal device in accordance with the foregoing method examples. For example, each functional unit may be divided per each function, and two or more functions may be integrated in one processing unit. The above-mentioned integrated unit can be implemented in the form of hardware or software functional units. It should be noted that the division of units in the implementations of the present disclosure is schematic and is merely a logical function division, and there may be other division manners in actual implementation.

Figure 6:
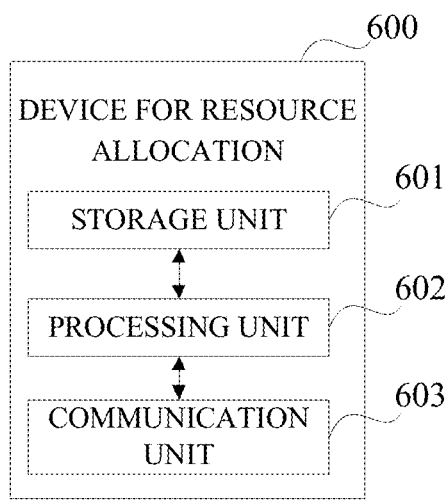
FIG. 6 is a block diagram illustrating functional units of a terminal device according to an implementation of the present disclosure.

FIG. 6 is a block diagram illustrating possible functional units of a device for resource allocation involved in the above implementations. The device 600 is applicable to a terminal device with an operating system and at least one application. The device 600 includes a processing unit 602 and a communication unit 603. The processing unit 602 is configured to control and manage operations of the device 600. For example, the processing unit 602 is configured to support the device 600 to execute the operations at blocks 201-203 in FIG. 2, the operations at block 301-306 in FIG. 3, the operations at blocks 401-408 in FIG. 4, and/or other operations of the technology described in the context. The device 600 can further include a storage unit 601 storing program codes and data.

The processing unit 602 is configured to control the operating system to receive via the communication unit 603 a selection operation performed on a target widget of an operation interface of a target application of the terminal device, control the operating system to obtain via the communication unit 603 a resource adjustment strategy corresponding to the selection operation performed on the target application, and control the operating system to adjust allocation of one or more system resources for the target application within a time interval associated with the selection operation performed on the target widget according to the resource adjustment strategy.

In a possible implementation, as for obtaining the resource adjustment strategy corresponding to the selection operation performed on the target widget, the processing unit 602 is configure to determine an application behavior associated with the selection operation performed on the target widget, where the application behavior is configured for indicating at least one operation to be executed by the target application after the target widget of the target application being selected. The processing unit 602 is configured to determine resource load information corresponding to the application behavior, where the resource load information is configured for describing influence on the system resources, and the influence is generated by the application behavior. The processing unit 602 is further configured to determine the resource adjustment strategy according to the resource load information.

In a possible implementation, the terminal device stores an application behavior library, and the application behavior library contains an association relationship between multiple selection operations and multiple application behaviors. As for determining the application behavior associated with the selection operation performed on the target widget, the processing unit 602 is configured to determine the application behavior associated with the selection operation performed on the target widget via querying the application behavior library.

In a possible implementation, the processing unit 602 is further configured to obtain operation records of widgets of the operation interface of the target application, and obtain at least one operation record set via analyzing the operation records. Each of the operation records contains information of a selection of at least two widgets of the operation sequentially. Each operation record set contains multiple operation record groups, and each operation record group contains multiple operation records with the same first selected widgets. The multiple operation records are continuous operation records, and the first selected widgets of the operation records in each operation record group are the same. The processing unit 602 is further configured to generate the application behavior library according to the at least one operation record set.

In a possible implementation, the processing unit 602 is further configured to display an application behavior setting interface associated with the target application, obtain at least one application behavior via the application behavior setting interface, and generate the application behavior library according to the at least one application behavior.

In a possible implementation, before the operating system receives the selection operation performed on the target widget of the operation interface of the target application, the processing unit 602 is further configured to obtain via a preset private connection the application behavior associated with the target widget from the application behavior library of the target application. The preset private connection is a communication connection between processes based on a verification and authority mechanism, that is, the verification and authority mechanism is employed for the communication connection between processes. The communication connection between processes may include at least one of the following: socket, pipe, FIFO, memory share, and file share.

In a possible implementation, before the operating system receives via the preset private connection the selection operation performed on the target widget of the operation interface of the target application, the processing unit 602 is further configured to receive a request for establishing a private connection from the target application, where the request for establishing a private connection contains an application identifier of the target application. The processing unit 602 is further configured to establish the preset private connection when the application identifier is contained in a preset application identifier set.

In a possible implementation, the system resources include at least one of the following: CPU resources, GPU resources, memory bandwidth resources, disk resources, and network resources.

The processing unit 602 may be a processor or a controller. The communication unit 603 may be an internal communication interface between a processor and a program space, for example, a communication interface between the processor and an operating system space, or a communication interface between the processor and a user space. The storage unit 601 may be a memory.

Figure 7:
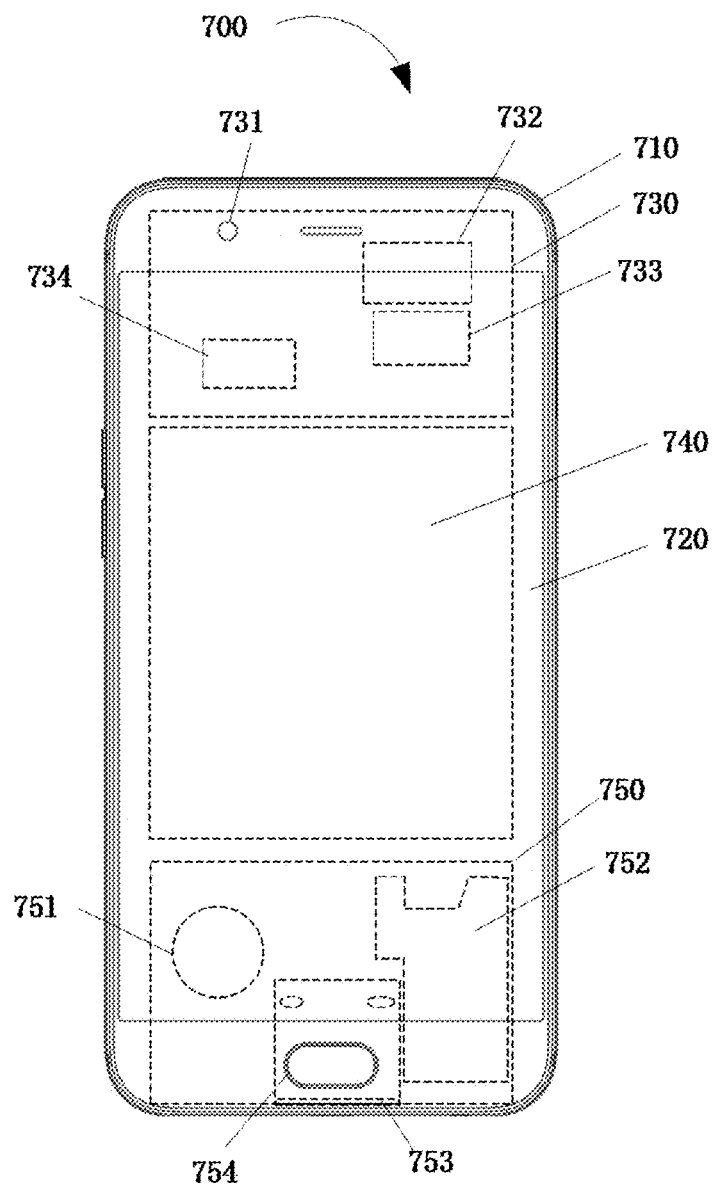
FIG. 7 is a schematic structural diagram illustrating a smart phone according to an implementation of the present disclosure.

Referring to FIG. 7, FIG. 7 is a schematic structural diagram illustrating a smart phone 700 according to an implementation of the present disclosure. The smart phone 700 includes a housing 710, a touch screen 720, a main board 730, a battery 740, and a sub-board 750. The main board 730 is provided with a front camera 731, a processor 732, a memory 733, a power management chip 734, and the like. The sub-board 750 is provided with a vibrator 751, an integrated audio cavity 752, a flash charging interface 753, and a fingerprint recognition module 754.

The smart phone has a target application and an operating system. The target application runs in a user space and the operating system runs in an operating system space. The operating system receives a selection operation performed on a target widget of an operation interface of the target application, obtains a resource adjustment strategy corresponding to the selection operation performed on the target application, and adjusts allocation of system resources for the target application within a time interval associated with the selection operation performed on the target widget according to the resource adjustment strategy.

The processor 732 is the control center of the smart phone and is configured to connect various parts of the whole smart phone through various interfaces and lines, run or execute software programs and/or modules stored in the memory 733, and invoke data stored in the memory 733 to perform various functions of the mobile phone and process data, thereby monitoring the mobile phone as a whole. Alternatively, the processor 732 may include one or more processing units. For example, the processor 732 may integrate an application processor and a modem processor, where the application processor is mainly configured to handle the operating system, the user interface, the applications, and so on, and the modem processor is mainly configured to process wireless communication. It is to be understood that the above-mentioned modem processor may not be integrated into the processor 732. The processor 732 may be, for example, a CPU, a general-purpose processor, a digital signal processor (DSP), an application specific integrated circuit (ASIC), a field programmable gate array (FPGA), or other programmable logic devices, transistor logic devices, hardware components, or any combination thereof. Various exemplary logical blocks, modules, and circuits described in conjunction with the disclosure may be achieved or implemented. The processor may also be a combination of computing functions, for example, a combination of one or more microprocessors, a combination of the DSP and the microprocessor, and the like.

The memory 733 stores software programs and modules, and the processor 732 is configured to execute various function applications and data processing of the mobile phone by running the software programs and the modules stored in the memory 733. The memory 733 mainly includes a program storage area and a data storage area. The program storage area may store an operating system, applications required for at least one function, and so on. The data storage area may store data created according to use of the smart phone, and so on. In addition, the memory 733 may include a high-speed RAM, and may further include a non-transitory memory such as at least one disk storage device, a flash device, or other non-transitory solid storage devices. The memory 733 may be, for example, a random access memory (RAM), a flash memory, a read only memory (ROM), an erasable programmable ROM (EPROM), an electrically EPROM (EEPROM), a register, a hard disk, a mobile hard disk, a compact disc-read only memory (CD-ROM), or any other form of storage medium known in the art.

Implementations of the present disclosure also provide a computer readable storage medium. The computer readable storage medium stores computer programs for electronic data interchange which, when executed, are operable with a computer to execute all or part of the operations of any of the methods described in the above-described method implementations. The computer may include a terminal device.

Implementations of the present disclosure also provide a computer program product. The computer program product includes a non-transitory computer readable storage medium that stores computer programs. The computer programs are operable with a computer to perform all or part of the operations of any of the methods described in the above method implementations. The computer program product may be a software installation package, and the computer may include a terminal device.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, it is to be understood that the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a ROM, a RAM, a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer readable memory, which may include a flash memory, a ROM, a RAM, Disk or CD, and so on.

The above illustrates the implementations of the present disclosure in detail. The specification employs specific examples to illustrate the principle and implementation manners of the present disclosure. The illustration of the above implementations is just used to help in understanding of the method and core concept of the present disclosure. Meanwhile, for a person ordinarily skilled in the art, depending on the concept of the present disclosure, changes may be made on the specific implementations and application range. In conclusion, the content of the specification shall not be understood to limit the present disclosure.

What is claimed is:

1. A method for resource allocation, comprising:
   receiving, by an operating system of a terminal device, a selection operation performed on a target widget of an operation interface of a target application of the terminal device;
   determining, by the operating system, an application behavior upon receipt of the selection operation on the target widget, wherein the application behavior contains a selection sequence of at least two widgets that comprise the target widget, and wherein in the selection sequence the target widget is first selected;
   determining, by the operating system, resource load information corresponding to the application behavior, wherein the resource load information is configured for describing influence on at least one system resource, and the influence is generated by the application behavior;
   obtaining, by the operating system, a resource adjustment strategy corresponding to the selection operation performed on the target widget according to the resource load information; and
   adjusting, by the operating system, allocation of the at least one system resource for the target application within a time interval associated with the selection operation performed on the target widget according to the resource adjustment strategy;
   wherein determining, by the operating system, the application behavior associated with the selection operation performed on the target widget comprises:
   determining, by the operating system, the application behavior associated with the selection operation performed on the target widget via querying an application behavior library stored in the terminal device, wherein the application behavior library contains an association relationship between a plurality of selection operations and a plurality of application behaviors; and
   before determining, by the operating system, the application behavior associated with the selection operation performed on the target widget via querying the application behavior library stored in the terminal device;
   obtaining, by the operating system, operation records of widgets of the operation interface of the target application, wherein each of the operation records contains information of a selection of at least two widgets of the operation interface sequentially;
   obtaining, by the operating system, a plurality of operation record groups via analyzing the operation records, wherein each of the plurality of operation record groups contains at least two operation records with the same first selected widgets; and
   generating, by the operating system, the application behavior library according to the plurality of operation record groups.

2. The method of claim 1, wherein receiving, by the operating system, the selection operation performed on the target widget of the operation interface of the target application comprises:
   receiving, by the operating system, the selection operation performed on the target widget of the operation interface of the target application via a preset private connection, wherein the preset private connection is a communication connection between processes based on a verification and authority mechanism, and the communication connection between processes comprises at least one of the following: socket, pipe, first-in first-out (FIFO), memory share, and file share.

3. The method of claim 2, further comprising:
   before receiving, by the operating system, the selection operation performed on the target widget of the operation interface of the target application via the preset private connection:
   receiving, by the operating system, a request for establishing a private connection from the target application, wherein the request for establishing a private connection contains an application identifier of the target application; and
   establishing, by the operating system, the preset private connection when the application identifier is contained in a preset application identifier set.

4. A terminal device, comprising:
   at least one processor; and
   a computer readable memory, coupled with the at least one processor and storing at least one computer executable instruction therein which, when executed by the at least one processor, causes the at least one processor to:
receive, with an operating system of the terminal device, a selection operation performed on a target widget of an operation interface of a target application of the terminal device;
determine, by the operating system, an application behavior upon receipt of the selection operation on the target widget, wherein the application behavior contains a selection sequence of at least two widgets that comprise the target widget, and wherein in the selection sequence the target widget is first selected;
determine, by the operating system, resource load information corresponding to the application behavior, wherein the resource load information is configured for describing influence on at least one system resource, and the influence is generated by the application behavior;
obtain, with the operating system, a resource adjustment strategy corresponding to the selection operation performed on the target widget according to the resource load information; and
adjust, with the operating system, allocation of the at least one system resource for the target application within a time interval associated with the selection operation performed on the target widget according to the resource adjustment strategy;
wherein the at least one computer executable instruction causing the at least one processor to determine, with the operating system, the application behavior associated with the selection operation performed on the target widget further causes the at least one processor to:
determine, with the operating system, the application behavior associated with the selection operation performed on the target widget via querying an application behavior library stored in the terminal device, wherein the application behavior library contains an association relationship between a plurality of selection operations and a plurality of application behaviors;
wherein the at least one computer executable instruction further causes the at least one processor to:
display, with the operating system, an application behavior setting interface associated with the target application;
obtain, with the operating system, at least one application behavior via the application behavior setting interface; and
generate, with the operating system, the application behavior library according to the at least one application behavior.

5. The terminal device of claim 4, wherein the at least one computer executable instruction causing the at least one processor to receive, by the operating system, the selection operation performed on the target widget of the operation interface of the target application further causes the at least one processor to:
receive, with the operating system, the selection operation performed on the target widget of the operation interface of the target application via a preset private connection, wherein the preset private connection is a communication connection between processes based on a verification and authority mechanism, and the communication connection between processes comprises at least one of the following: socket, pipe, first-in first-out (FIFO), memory share, and file share.

6. The terminal device of claim 5, wherein the at least one computer executable instruction causing the at least one processor to:
receive, with the operating system, a request for establishing a private connection from the target application, wherein the request for establishing a private connection contains an application identifier of the target application; and
establish, with the operating system, the preset private connection when the application identifier is contained in a preset application identifier set.

7. A terminal device, comprising:
at least one processor; and
a computer readable memory, coupled with the at least one processor and storing at least one computer executable instruction therein which, when executed by the at least one processor, causes the at least one processor to:
determine, with an operating system, an application behavior associated with a selection operation via querying an application behavior library stored in the terminal device, wherein the application behavior is configured for indicating at least one operation to be executed by a target application after a target widget of the target application being selected, and wherein the application behavior library contains an association relationship between a plurality of selection operations and a plurality of application behaviors;
determine, with the operating system, resource load information corresponding to the application behavior, wherein the resource load information is configured for describing influence on at least one system resource, and the influence is generated by the application behavior;
obtain, with the operating system, a resource adjustment strategy corresponding to the selection operation performed on the target widget according to the resource load information; and
adjust, with the operating system, allocation of the at least one system resource for the target application within a time interval associated with the selection operation performed on the target widget according to the resource adjustment strategy;
the at least one computer executable instruction further causing the at least one processor to:
obtain, with the operating system, operation records of widgets of an operation interface of the target application, wherein each of the operation records contains information of a selection of at least two widgets of the operation interface sequentially;
obtain, with the operating system, a plurality of operation record groups via analyzing the operation records, wherein each of the plurality of operation record groups contains at least two operation records with the same first selected widgets; and
generate, with the operating system, the application behavior library according to the plurality of operation record groups.

8. The terminal device of claim 7, wherein the at least one computer executable instruction causing the at least one processor to adjust, with the operating system, the at least one system resource for the target application according to the resource adjustment strategy further causes the at least one processor to:
adjust, with the operating system, the at least one system resource for the target application according to an adjustment amount of each of the at least one system resource, wherein the resource adjustment strategy contains the adjustment amount of each of the at least one system resource.

* * * * *